United States Patent
Takayanagi et al.

(10) Patent No.: US 8,349,773 B2
(45) Date of Patent: Jan. 8, 2013

(54) SLIDE MEMBER

(75) Inventors: Satoshi Takayanagi, Inuyama (JP);
Yukihiko Kagohara, Inuyama (JP);
Hideo Tsuji, Inuyama (JP); Shigeya Haneda, Inuyama (JP)

(73) Assignee: Daido Metal Company Ltd., Naka-Ku, Nagoya (JP)

( * ) Notice: Subject to any disclaimer, the term of this patent is extended or adjusted under 35 U.S.C. 154(b) by 327 days.

(21) Appl. No.: 12/686,456

(22) Filed: Jan. 13, 2010

(65) Prior Publication Data
US 2010/0177995 A1   Jul. 15, 2010

(30) Foreign Application Priority Data
Jan. 13, 2009   (JP) ................. 2009-004526

(51) Int. Cl.
*C10M 171/00*   (2006.01)
(52) U.S. Cl. .................... 508/100; 384/13
(58) Field of Classification Search ........... 508/100; 384/13
See application file for complete search history.

(56) References Cited

U.S. PATENT DOCUMENTS

| | | | |
|---|---|---|---|
| 5,313,919 A * | 5/1994 | Rao et al. | 123/193.4 |
| 5,616,406 A | 4/1997 | Nakamaru et al. | |
| 2003/0180572 A1 * | 9/2003 | Norito et al. | 428/673 |
| 2007/0116936 A1 | 5/2007 | Fujita et al. | |
| 2008/0159671 A1 | 7/2008 | Leonardelli | |

FOREIGN PATENT DOCUMENTS
JP   2007139149 A1   6/2007

* cited by examiner

*Primary Examiner* — Walter D Griffin
*Assistant Examiner* — Taiwo Oladapo
(74) *Attorney, Agent, or Firm* — Browdy & Neimark, PLLC

(57) ABSTRACT

In a slide member in which an overlay is provided on a slide receiving surface of a base member, the overlay is formed by attaching a mixed solid lubricant on the slide receiving surface of the base member. The mixed solid lubricant is made by mixing a large amount of hydrogen containing solid lubricant which contains a large amount of hydrogen, and a small amount of hydrogen containing solid lubricant which contains a smaller hydrogen amount than the large amount of hydrogen containing lubricant. Thereby, a lubricant absence region where the solid lubricant is absent in a thickness direction is formed on the slide receiving surface of the base member after sliding, and an oxidized portion where the base member is oxidized is formed in the lubricant absence region.

10 Claims, 3 Drawing Sheets

SLIDE MEMBER

RELATED APPLICATION

This application claims priority from Japanese Patent Application No. 2009-004526, filed Jan. 13, 2009, which is incorporated by reference in its entirety.

BACKGROUND OF THE INVENTION (1) Field of the Invention

The present invention relates to a slide member in which an overlay is provided on a slide receiving surface of a base member.

(2) Description of Related Art

A slide member such as a slide bearing used for an internal combustion engine of an automobile, a general industrial machine and the like requires excellent anti-seizure property, conformability, fatigue resistance and wear resistance. As a slide bearing for an internal combustion engine, there are an aluminum base alloy bearing in which an aluminum alloy is lined on a back metal layer, a copper base alloy bearing in which a copper alloy is lined on a back metal layer, and bearings in which overlay layers are provided on surfaces of these bearing alloy layers, and these bearings are used properly depending on the condition of operation.

In recent years, the internal combustion engines trend to increase in speed and output power, and be enhanced in fuel efficiency, and the slide member is required to have a lower frictional property in addition to the above described properties. In order to obtain the lower frictional property, it has been conceivable to provide a layer containing solid lubricant particles on a surface (slide receiving surface) of a bearing alloy layer (base member) of a bearing, for example.

As an art of providing the layer containing solid lubricant particles on a surface of a bearing alloy layer, there is conventionally known a method of providing a resin overlay layer containing solid lubricant particles on the surface of the bearing alloy layer. Generally, the resin overlay layer is formed by mixing the solid lubricant particles in a resin binder, and coating the surface of the bearing alloy layer with this mixture.

Meanwhile, there is also a method of coating the surface of the bearing alloy layer only with the solid, lubricant particles without a resin binder in order to enhance the lubricity (lower frictional property) more. For example, JP-A-2007-139149 discloses that solid lubricant particles are adhered to a surface of a bearing alloy layer (base member) while causing friction therebetween, and the overlay layer in which a number of solid lubricant particles exist is coated on the surface of the bearing alloy layer.

BRIEF SUMMARY OF THE INVENTION

The slide member which is provided with the overlay layer as described in JP-A-2007-139149 has a lower frictional property since the overlay layer is formed from solid lubricant particles. Therefore, when the overlay layer of the slide member slides on a counterpart member while contacting with it, the heat generation amount due to friction is small. Thereby, the base member located under the overlay layer hardly receives the influence of heat due to friction. In this state, if the overlay layer is worn and disappears, and the base member is exposed, the surface of the base member and the counterpart member slide while contacting with each other, and the base member would be worn. At this time, since the base member is relatively soft, wear of the base member relatively easily advances. Accordingly, it is conceivable in this slide member that the wear amount of the base member increases under the harsh environment, the useful life of the slide member becomes short, and the gap between the slide member and the counterpart member becomes large to cause wobbling and noise.

The present invention is made in view of the above described circumstances, and an object thereof is to provide a slide member excellent in lower frictional property and wear resistance.

The inventors of the invention paid attention to the hydrogen amount contained in a solid lubricant and earnestly repeated experiments. As a result thereof, the inventors have elucidated that the bonding strength between the overlay and the base member (bearing alloy layer) is influenced by the hydrogen amount contained in the solid lubricant forming the overlay. More specifically, the present inventors have elucidated that the overlay formed from a solid lubricant with a high content of hydrogen has a weak bonding force to the base member, this overlay is easily removed by slide contact with a counterpart member, and the surface of the base member that is exposed in the removed portion is oxidized to apt to form a hard oxidized portion, while the overlay formed from a solid lubricant with a low content of hydrogen has a strong bonding force to the base member, and this overlay is hardly removed by slide contact with a counterpart member.

The inventors of the invention have made the present invention of the sliding member excellent in lower frictional property and wear resistance based on these circumferences.

The invention according to claim 1 is characterized in that, in a slide member in which an overlay is provided on a slide receiving surface of a base member, the overlay is formed by attaching a mixed solid lubricant on the slide receiving surface of the base member, and the mixed solid lubricant is made by mixing at least two kinds of solid lubricants which are a large amount of hydrogen containing solid lubricant which contains a large amount of hydrogen and a small amount of hydrogen containing solid lubricant which contains a smaller amount of hydrogen than that of the large amount of hydrogen containing lubricant.

In the invention, the overlay may be provided to cover the entire slide receiving surface of the base member, or may be provided on a part of the slide receiving surface of the base member.

FIG. 1 illustrates a section of a slide member 3 in which an overlay 22 is provided on a slide receiving surface 7 of a base member 1 on the basis of a microphotograph. Here, the base member 1 mentioned in the present invention is a member to which the overlay 22 is provided, and is an aluminum based bearing alloy layer, a copper based bearing alloy layer, other bearing alloy layers, a member corresponding to a back metal layer in the case of supporting a counterpart member with the member corresponding to the back metal layer without providing a bearing alloy layer, or a covering layer provided on a bearing alloy layer or a back metal layer, for example. The overlay 22 is formed by a generally used solid lubricant 2, e.g., any of molybdenum disulfide ($MoS_2$), graphite (C), tungsten disulfide ($WS_2$) and, boron nitride (BN), or a combination thereof. The thickness of the overlay 22 is 2 μm at the largest when measuring the microphotograph.

FIG. 2 is a schematic view of a section of the slide member 3 in which the overlay 22 is provided on the slide receiving surface 7 of the base member 1.

The overlay 22 of the present invention is formed by a large amount of hydrogen containing solid lubricant (particle) 2A containing a large amount of hydrogen, and a small amount of hydrogen containing solid lubricant (particle) 2B containing a smaller amount of hydrogen than the large amount of hydrogen containing solid lubricant 2A. The content of hydrogen is adjusted by adding a desired amount of water to the solid lubricant 2, for example. As a means of obtaining the solid lubricant 2 (the large amount of hydrogen containing solid lubricant 2A, the small amount of hydrogen containing solid lubricant 2B) containing a desired amount of hydrogen, there is the method in which the solid lubricant 2 is dried, and the water content, namely, the hydrogen amount is reduced to 0%, and thereafter water content is added to be contained by spraying steam to the solid lubricant 2 for a predetermined time period. Other than this, there is also the method in which the solid lubricant 2 is held in the space which is kept at a predetermined humidity and temperature for a predetermined time period. Further, there is also the method in which instead of adjusting the hydrogen amount by the water content, hydrogen gas is sprayed to the solid lubricant 2 so that a desired hydrogen amount is contained, and the like. In the present invention, the overlay 22 is formed by two kinds of solid lubricants 2 (the large amount of hydrogen containing solid lubricant 2A, the small amount of hydrogen containing solid lubricant 2B) differing in the hydrogen amount, but the overlay 22 may be formed by three or more kinds of the solid lubricants 2 differing in the hydrogen amount.

The overlay 22 is formed by obtaining a mixed solid lubricant 2C by mixing these large amount hydrogen containing solid lubricant 2A and small amount of hydrogen containing solid lubricant 2B, and by lining the mixed solid lubricant 2C on the surface of the base member 1. The water amount in the large amount of hydrogen containing solid lubricant 2A is preferably 5.0 to 10.0 mass % in vie of manufacturing, and is more preferably 6.5 to 8.0 mass %.

By obtaining the mixed solid lubricant 2C by sufficiently mixing the large amount of hydrogen containing solid lubricant 2A and the small amount of hydrogen containing solid lubricant 2B, the large amount of hydrogen containing solid lubricant 2A and the small amount of hydrogen containing solid lubricant 2B in the overlay 22 can be caused to exist to be uniformly distributed. In the slide member, the existence distribution may be changed to increase the content ratio of the large amount of hydrogen containing solid lubricant 2A in a high load portion, and the like.

Next, an effect of the slide member 3 with the above described configuration will be described with reference to FIGS. 1 to 4. In FIGS. 1 to 4, description is made on the assumption that the base member 1 is a bearing alloy layer formed by an aluminum alloy, and the overlay 22 is formed by $MoS_2$ of the solid lubricant 2 for convenience.

FIG. 3 shows a section of the state in which the overlay 22 is worn after the counterpart member not illustrated slides on the overlay 22 of the slide member 3 on the basis of a microphotograph. FIG. 4 is a schematic view showing the section of the state in which the overlay 22 is worn by the same illustration method as FIG. 2.

When the counterpart member not illustrated is directly contacted with the overlay 22 on the base member 1, in other words, when contact occurs due to oil film break caused by unevenness of oil film pressure distribution, the overlay 22 is worn. When the wearing advances, a part of the surface of the base member 1 is soon exposed, and a lubricant absence region 4 where the solid lubricant 2 does not exist is formed on the slide receiving surface 7 of the base member 1. In the lubricant absence region 4, the base member 1 and the counterpart member are directly in contact with each other. Thereby, frictional heat occurs, and a hard oxidized portion 5 is formed in a contact portion of the base member 1. The presence of the oxidized portion 5 is confirmed by the EDX (energy dispersive X-ray spectroscopy), the WDX (wavelength dispersive X-ray spectroscopy), or the like. The portion which is not oxidized in the base member 1 is called a non-oxidized portion 6. The non-oxidized portion 6 is softer than the oxidized portion 5. Due to influence of oxidization peculiar to the base member 1 and frictional heat, and the like, oxidization is sometimes seen in a portion of the base member 1 that does not directly contact with the counterpart member, namely, in an inward direction of the base member 1 from the region where the solid lubricant 2 is present on the slide receiving surface 7. The depth of the oxidization is smaller than the aforementioned oxidized portion 5, and is about 5 nm in the case of, for example, an Al based alloy. The hardness of the oxidized portion 5 is higher than the hardness in the same volume in the inward direction of the base member from the region where the solid lubricant 2 is present on the slide receiving surface 7.

As shown in FIGS. 3 and 4, after sliding, the solid lubricant 2 which forms the overlay 22 remains on a part of the base member 1. Most of the remaining solid lubricant 2 is the small amount of hydrogen containing solid lubricant 2B.

When the slide member 3 in the state of FIGS. 3 and 4 further slides on the counterpart member, the whole solid lubricant 2 remaining on a part of the base member 1 will be removed soon. At this time, the region corresponding to the portion under the solid lubricant 2 which remains on the base member 1 is hardly influenced by the frictional heat owing to the solid lubricant 2, and therefore, many non-oxidized portions 6 and many shallow oxidization portions are present in that region. More specifically, when the whole overlay 22 (solid lubricant 2) is removed, the oxidized portions 5 and the non-oxidized portions 6 mixedly exist on the slide receiving surface 7 of the base member 1, and a variation in the oxidization depth from the slide receiving surface 7 is present.

As above, the overlay 22 is formed by the large amount of hydrogen containing solid lubricant 2A having a small bonding force to the base material 1 and the small amount of hydrogen containing solid lubricant 2B having a large bonding force to the base member 1, and the large amount of hydrogen containing solid lubricant 2A is removed by slide with the counterpart member, and therefore, the solid lubricant 2 having the effect of lower frictional property and the oxidized portion 5 excellent in wear resistance can be allowed to exist mixedly on the slide receiving surface 7 of the base member 1 after sliding. Thereby, the slide member 3 excellent in lower frictional property and wear resistance can be obtained. Considering the formation ratio of the lubricant absence region 4, the large amount of hydrogen containing lubricant 2A is preferably 40 to 90 mass % in the mixed solid lubricant 2C, and is more preferably 55 to 75 mass %. The content ratio of the large amount of hydrogen containing solid lubricant 2A or the small amount of hydrogen containing solid lubricant 2B can be controlled in accordance with use.

The invention according to claim 2 is characterized in that the relational expression of $1<H_1/H_2 \leq 5$ is satisfied where $H_1$ is an average hydrogen amount per unit quantity in the overlay, and $H_2$ is an average hydrogen amount per unit quantity in the base member.

FIG. 5 shows a hydrogen amount per unit quantity with respect to the thickness direction of the slide member 3 in which the overlay 22 is provided on the slide receiving surface 7 of the base member 1. A region A in FIG. 5 shows the range in the thickness direction of the overlay 22, and a region B shows the range in the thickness direction of the base member 1. The hydrogen amount per unit quantity is measured by, for example, the GD-OES (glow discharge optical emission spectrometry). In this case, the hydrogen amount per unit quantity is the hydrogen amount converted into the hydrogen amount per unit area.

The hydrogen amount per each unit quantity in the overlay 22 (region A) is a relative value when "the average hydrogen amount $H_2$ per unit quantity in the base member 1" which is the result of averaging the hydrogen amount per unit quantity in the base member 1 (region B) is assumed to be 1. Further, the average of the hydrogen amount per unit quantity in the overlay 22 is shown in FIG. 5 as "the average hydrogen amount $H_1$ per unit quantity in the overlay 22".

In FIG. 5, the hydrogen amount per unit quantity in the base member 1 is the hydrogen amount per unit quantity in the case that the base member 1 is dehydrated, but is not 0% since hydrogen inevitably exists in the base member 1. The hydrogen amount per unit quantity in the base member 1 may be the hydrogen amount per unit quantity in the case that the base member 1 is not dehydrated. In the present invention, the hydrogen amount per unit quantity in the overlay 22 is made relatively larger than the hydrogen amount per unit quantity in the base member 1 by controlling the water amount or the hydrogen amount, or by controlling the content ratio of the large amount of hydrogen containing solid lubricant 2A or the small amount of hydrogen containing solid lubricant 2B in the overlay 22.

When the average hydrogen amount $H_1$ is in the range of one to five times (one is not included) of the average hydrogen amount $H_2$, the slide member 3 more excellent in lower frictional property and wear resistance can be obtained. More specifically, when $1 < H_1/H_2 \leq 5$, the ratio of the large amount of hydrogen containing solid lubricant 2A and the ratio of the small amount of hydrogen containing solid lubricant 2B in the overlay 22 become appropriate, and the oxidized portion 5 which can sufficiently exhibit wear resistance can be formed. In addition, the slide member 3 can sufficiently exhibit the lower frictional property by the solid lubricant 2.

The invention according to claim 3 is characterized in that, in a slide member in which an overlay is provided on a slide receiving surface of a base member, the overlay is formed by attaching a mixed solid lubricant on the slide receiving surface of the base member, the mixed solid lubricant is made by mixing at least two kinds of solid lubricants which are a large amount of hydrogen containing solid lubricant which contains a large amount of hydrogen and a small amount of hydrogen containing solid lubricant which contains a smaller amount of hydrogen than that of the large amount of hydrogen containing lubricant, and the relational expression of $1 < H_1/H_2 \leq 5$ is satisfied where $H_1$ is an average hydrogen amount per unit quantity in the overlay, and $H_2$ is an average hydrogen amount per unit quantity in the base member. The slide member excellent in lower frictional property and abrasion resistance can be provided.

The invention according to claim 4 is characterized in that a lubricant absence region where the solid lubricant is absent is present on the slide receiving surface of the base member after sliding, and an oxidized portion where the base member is oxidized is formed in an inward direction of the base member from the lubricant absence region.

Here, the "after sliding" means after a full-load operation of an endurance test of an engine is performed for 200 to 300 hours, for example, and this corresponds to a travel distance of 30,000 km to 300,000 km in the case of use as a main bearing of an automobile engine, for example.

As described above, the large amount of hydrogen containing lubricant 2A is more easily removed from the base member 1 by sliding on the counterpart member than the small amount of hydrogen containing solid lubricant 2B. Thereby, the lubricant absence region 4 is formed in a region of the base member 1 after sliding, where the large amount of hydrogen containing lubricant 2A is removed. In the lubricant absence region 4, the slide receiving surface 7 of the base member 1 is exposed and oxidized, and the hard oxidized portion 5 is formed. Thereby, the slide member 3 becomes excellent in wear resistance.

The invention according to claim 5 is characterized in that the depth of the oxidized portion is 0.01 to 0.7 μm from the surface of the base member.

The depth dimension of the oxidized portion 5 is confirmed by the aforementioned EDX (energy dispersive X-ray analysis) or WDX (wavelength dispersive X-ray analysis). If the depth dimension of the oxidized portion 5 is 0.01 μl or more from the slide receiving surface 7 of the base member 1, the effect by the presence of the oxidized portion 5 remarkably appears, and the wear resistance of the slide member 3 is easily enhanced. If the depth dimension of the oxidized portion 5 is 0.7 μm or less from the slide receiving surface 7 of the base member 1, a relatively large number of non-oxidized portions 6 which are softer than the oxidized portion 5 are present in the base member 1. Thereby, the lower frictional property and the wear resistance of the slide member 3 are made favorable, and conformability can be made favorable also.

The invention according to claim 6 is characterized in that the film thickness of the overlay is 2 μl or less.

If the thickness of the overlay is 2 μm or less, the overlay is difficult to be removed. The thickness of the overlay is preferably 0.05 μm or more, and if it is 0.1 μm or more, the overlay exhibits the effect of the solid lubricant especially remarkably.

DETAILED DESCRIPTION OF THE INVENTION

Hereinafter, an embodiment of the present invention will be described.

Figure 1:
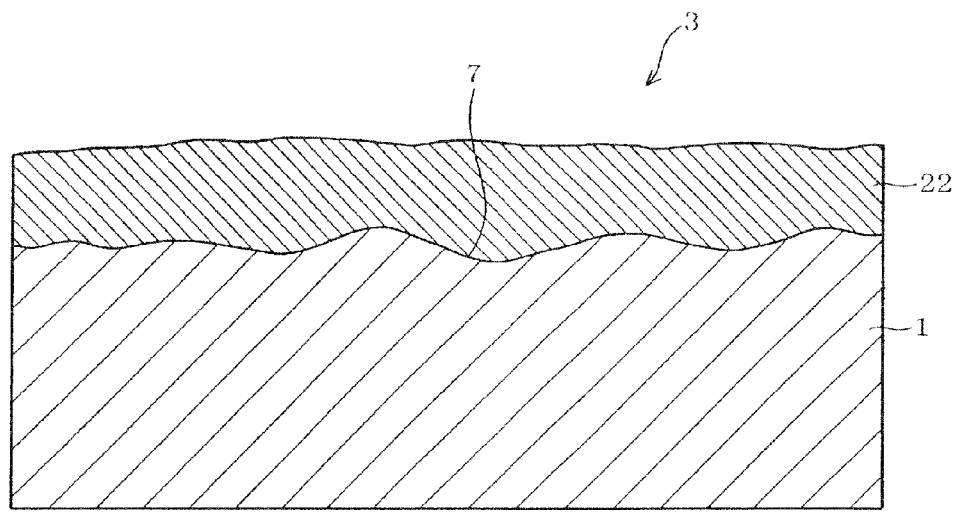
FIG. 1 is a sectional view of a slide member of the present invention before sliding.
Figure 2:
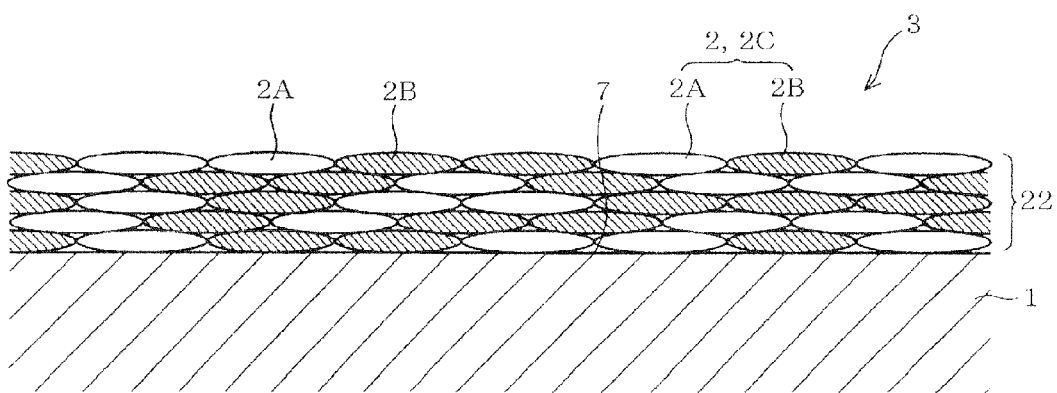
FIG. 2 is a schematic view showing a section of the slide member before sliding.
Figure 3:
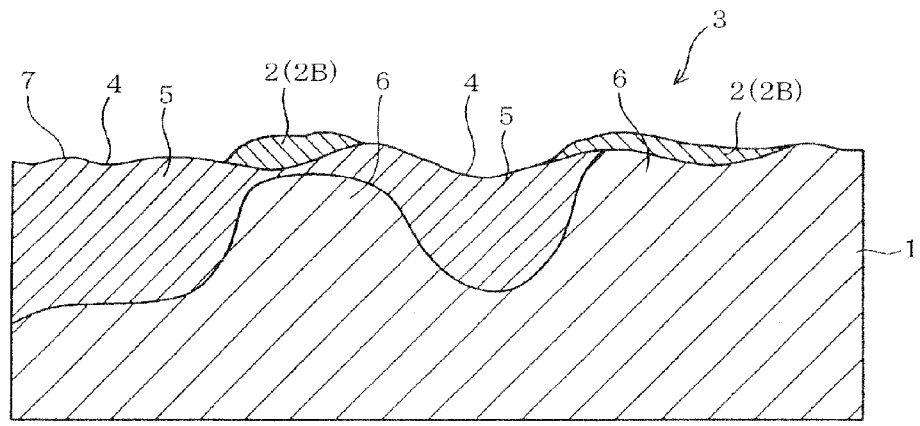
FIG. 3 is a sectional view of the slide member after sliding.
Figure 4:
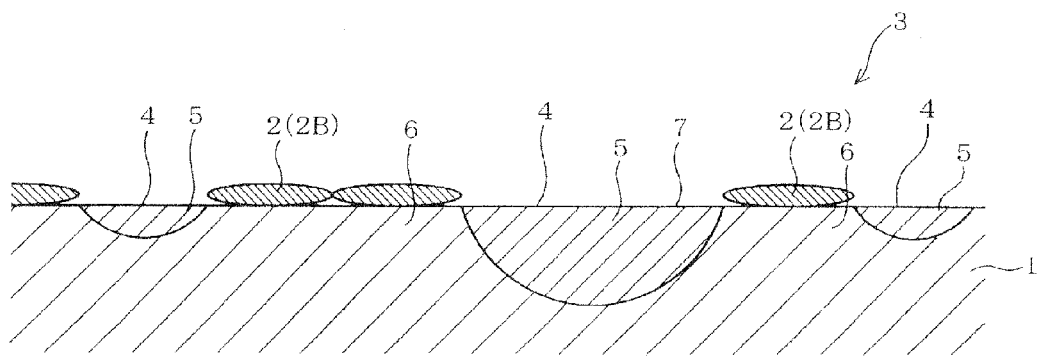
FIG. 4 is a schematic view showing a section of the slide member after sliding.
Figure 5:
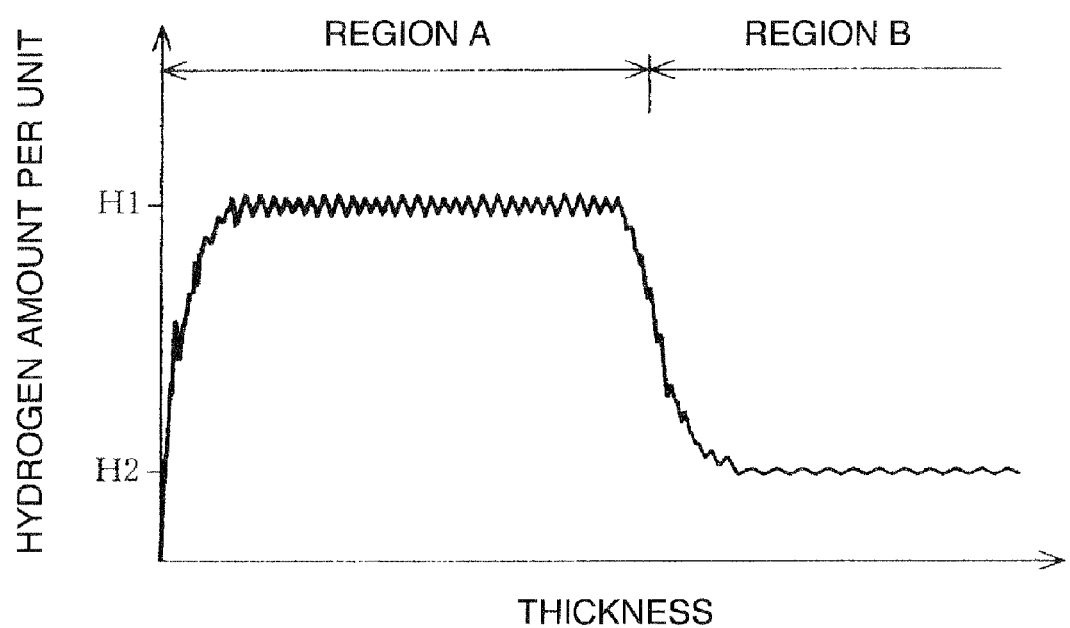
FIG. 5 is a diagram showing hydrogen amounts per unit in a base member and an overlay.

A slide member 3 of the embodiment of the present invention has the structure in which an aluminum based bearing alloy layer (hereinafter, called a base member 1) is provided on a back metal layer (not illustrated) formed from steel, and an overlay 22 formed from $MoS_2$ is provided on the base member 1, as shown in FIG. 1. In order to confirm the effect of the present invention, specimens (examples 1 to 5 and comparative examples 1 to 7) shown in Table 1 were produced, and the test for confirming wear was performed.

TABLE 1

| | SPECIMEN No. | H1/H2 | FRICTION COEFFICIENT | THICKNESS OF OVERLAY (μm) | WEAR AMOUNT (μm) | DEPTH OF OXIDIZED PORTION (μm) |
|---|---|---|---|---|---|---|
| EXAMPLE | 1 | 2.3 | 0.035 | 0.05 | 1.3 | 0.65 |
| | 2 | 3.9 | 0.040 | 0.7 | 1.9 | 0.02 |
| | 3 | 4.7 | 0.040 | 1.3 | 1.6 | 0.18 |
| | 4 | 1.2 | 0.035 | 1.8 | 1.5 | 0.3 |
| | 5 | 4.1 | 0.035 | 0.6 | 2.2 | 0.9 |
| COMPARATIVE | 1 | 0.8 | 0.035 | 0.3 | 3.2 | 0.005 |
| EXAMPLE | 2 | 0.6 | 0.040 | 1.6 | 3.9 | 0.005 |
| | 3 | 0.8 | 0.040 | 3.5 | 4.1 | 0.005 |
| | 4 | 0.4 | 0.035 | 7.3 | 8.1 | 0.005 |
| | 5 | — | 0.110 | 0 | 5.6 | 1.5 |
| | 6 | 6.3 | 0.095 | 1.1 | 3.1 | 0.8 |
| | 7 | 9.5 | 0.090 | 4.1 | 4.5 | 1.4 |

The production method of the specimens will be described. First, an aluminum alloy was melted and cooled, and a plate material of the aluminum alloy was produced. The plate material of the aluminum alloy was rolled, into a thin plate shape, and the thinned aluminum alloy plate material is brought into pressure contact with a steel plate constituting the back metal layer to produce a bearing forming plate material (bimetal). After the bimetal was annealed, the bimetal was worked into a semicircular shape, and a slide member of a half-split shape, that is, a slide bearing (half bearing) was obtained.

Thereafter, the mixed solid lubricant 2C obtained by mixing a large amount of hydrogen containing solid lubricant 2A and a small amount of hydrogen containing solid lubricant 2B is attached to a slide receiving surface (inner peripheral surface of the aluminum based bearing alloy layer) 7 of the base member 1 of each bearing half. The small amount of hydrogen containing solid lubricant 2B is made by drying $MoS_2$ of the solid lubricant 2 to eliminate contained water (hydrogen) as much as possible. The large amount of hydrogen containing solid lubricant 2A is made by drying $MoS_2$ of the solid lubricant 2 to eliminate contained water as much as possible, and by adding a larger amount of water by steam blast than the case of the small amount of hydrogen containing solid lubricant 2B. The water amount may be managed and adjusted without going through the step of driving $MoS_2$. In the present embodiment, the water amount in the large amount of hydrogen containing solid lubricant 2A was adjusted in such a manner that the small amount of hydrogen containing solid lubricant 2B which, is made by drying $MoS_2$ of the solid lubricant 2 to eliminate the contained water as much as possible has the hydrogen amount of 1.0 to 3.0 mass %. In concrete, the small amount of hydrogen containing solid lubricant 2B from which water was eliminated as much as possible was held in the room adjusted at a temperature of 25° C. and humidity of 70% for a predetermined time period, and the above described predetermined hydrogen amount was obtained.

Next, the large amount of hydrogen, containing solid lubricant 2A and the small amount of hydrogen containing solid lubricant 2B were sufficiently mixed, and the mixed solid lubricant 2C uniformly mixed was obtained. The ratio of the large amount of hydrogen containing solid lubricant 2A and the small amount of hydrogen containing solid lubricant B at this time is made such that the large amount of hydrogen containing solid lubricant 2A is 60 weight % and the small amount of hydrogen containing solid lubricant 2B is 40 weight %.

Next, the mixed solid lubricant 2C was attached to the surface of the base member 1. In this case, as shown in JP-A-2007-139149, the mixed solid lubricant 2C is freely adhered to an attachment medium (not illustrated), the attachment medium is slid on the surface of the base member 1 while applying the pressure to the surface of the base member 1, and the mixed solid lubricant 2C is adhered onto the surface of the base member 1 while causing friction therebetween so as to be stacked and layered by a proper amount, whereby the overlay 22 is formed on the base member 1. The overlay 22 constituted of the mixed solid lubricant 2C may be formed on the base member 1 by colliding the mixed solid lubricant 2C against the surface of the base member 1 by means of shot peening.

The hydrogen amounts in the overlays 22 of the specimens (examples 1 to 5 and comparative examples 1 to 7) which were obtained as above were measured by the GD-OES, and a plurality of values of "the hydrogen amount per unit quantity in the overlay 22" and a plurality of values of "the hydrogen amount per unit quantity in the base member 1" were obtained. Subsequently, from these values, the values of "the average hydrogen amount $H_1$ per unit quantity in the overlay 22" and "the average hydrogen amount $H_2$ per unit quantity in the base member 1" were obtained. The measurement conditions of the GD-OES are shown in Table 2. The ratio of "the average hydrogen amount $H_1$ per unit quantity in the overlay 22" and "the average hydrogen amount $H_2$ per unit quantity in the base member 1" ($H_1/H_2$) is shown in Table 1.

In measurement of the GD-OES, the accurate hydrogen amounts $H_1$ and $H_2$ sometimes cannot be measured due to noise. Therefore, in the present embodiment, "the average hydrogen amount $H_1$ per unit quantity in the overlay 22" and "the average hydrogen amount $H_2$ per unit quantity in the base member 1" were obtained as follows. In the present embodiment, by the GD-OES, the densities of the metal component (for example, if the solid lubricant is $MoS_2$, the component of Mo) and hydrogen in the solid lubricant which is present in the plane extending in the axial direction of each of the specimens are measured. In this case, when the overlay 22 is divided into a number of thin layers from its surface side, the elemental analysis is performed for each unit, the density of the metal component of the position (layer) at the depth at which the density of the metal component becomes the maximum value was set as $M_1$, and the hydrogen amount at the depth position of $M_1$ was set as $H_1$. Subsequently, measurement by the GD-OES was caused to proceed in the depth direction, the position of the depth at which the density of the metal component became $M_1/10$, namely, the position at which the density of Mo became $M_1/10$ in this case was regarded as "base member", the density of Mo at the position was set as $M_2$ (=$M_1/10$), and the hydrogen amount at the position at the depth of $M_2$ was set as $H_2$. The values of $H_1$ and $H_2$ are obtained as the averages of the hydrogen amounts in the range of ±50 nm in the depth direction from the positions of $M_1$ and $M_2$, in order to eliminate variation by measurement. In the present embodiment, the density of the metal component at the position of the depth at which the density of the metal component in the solid lubricant becomes the maximum value is set as $M_1$, but the density of the element component in the position at the depth at which the density of the element component with the maximum atomic weight in the solid lubricant becomes the maximum value may be set as $M_1$.

TABLE 2

| | CONDITION 1 |
|---|---|
| MEASUREMENT AREA | φ 2 mm × 1 μm |
| PRESSURE | 700 Pa |
| OUTPUT | 35 W |
| PULSE | 500 Hz |

For each of the specimens, the starting friction coefficient measurement test was performed. The test conditions are shown in Table 3, and the result thereof is shown in Table 1. The starting friction coefficient of comparative example 5 is set as 0.110, and the starting friction resistances of the other specimens are calculated relatively to this.

TABLE 3

| | CONDITIONS |
|---|---|
| PERIPHERAL SPEED | 1.0 m/sec. (START/STOP 1 CYCLE 4/sec) |
| LUBRICATING OIL | VG 10 |
| OIL SUPPLY AMOUNT | 5 cc/min |
| SHAFT MATERIAL | S55C |
| FRICTION COEFFICIENT EVALUATION METHOD | MEASURE STARTING FRICTION COEFFICIENT AFTER 2 HOURS |
| TEST LOAD | 4 MPa |
| WEAR AMOUNT MEASURING METHOD | MEASURE WEAR AMOUNT AFTER 5 HOURS |

Further, the results of measuring the average thickness of the overlay 22, the average wear amount and average depth of the oxidized portion 5 after sliding for predetermined hours was performed for the specimen for each of the specimens are shown in Table 1. The average wear amount after sliding for predetermined hours was performed for the specimen expresses the average wear amount after the starting friction coefficient measurement test was performed for five hours, in other words, the sum of the average depths of the worn overlay 22 and base member 1. The average depth of the oxidized portion 5 after sliding for predetermined hours was performed for the specimen expresses the average depth dimension of the oxidized portion 5 formed by performing the starting friction coefficient measurement test for five hours. The depth dimension is the dimension from the slide receiving surface 7 of the base member 1.

The average thickness of the overlay 22, the average wear amount and the average depth of the oxidized portion 5 were obtained by photographing the section of the overlay 22 of each of the specimens by a microscope, and the dimensions of the thickness and depth were obtained from the photographed image. The average wear amount was obtained by measuring the depths of the overlay 22 and the base member 1 at six spots before and after the starting friction coefficient measurement test by micrometer, and by obtaining the average thereof.

Next, the result of the above described test will be analyzed.

From comparison of the examples 1 to 5 and the comparative examples 1 to 4, 6 and 7 and comparative example 5, it is understood that the specimen provided with the overlay 22 is reduced in friction coefficient. From comparison of examples 1 to 5 and comparative examples 6 and 7, it is understood that when $H_1/H_2$ is five or less as in examples 1 to 5, lower friction coefficients can be obtained. This is considered to be the effect of lower frictional property of the overlay 22 which remains on the slide receiving surface 7 of the base member 1.

From comparison of examples 1 to 5 and comparative examples 1 to 4, it is understood that when $H_1/H_2$ is larger than 1 as in examples 1 to 5, the depth dimension of the oxidized portion 5 is large, and the wear amount is small. It is considered that this is because in examples 1 to 5, the lubricant absence region 4 is formed on the slide receiving surface 7 of the base member 1, and the hard oxidized portion 5 is formed on the base member 1, whereby wear resistance enhanced.

From comparison of examples 1 to 5 and comparative examples 1 to 4, it is understood that when the depth dimension of the oxidized portion 5 is 0.01 μm or more, the wear amount is reduced. It is considered that this is because when the depth dimension of the oxidized portion 5 is 0.01 μm or more, the oxidized portion 5 of the amount required for enhancing the wear resistance is present on the slide receiving surface 7 of the slide member 3. From comparison of examples 1 to 5 and comparative examples 5 to 7, it is understood that when the depth dimension of the oxidized portion 5 is 0.7 μm or less, a lower frictional coefficient is obtained. It is considered that this is because when the depth dimension of the oxidized portion 5 is 0.7 μm or less, the overlay 22 of the amount required for exhibiting a lower frictional property is present. It is considered that this is because as a result that a proper number of the non-oxidized portions 6 are present, recessed portions are formed in the non-oxidized portions 6, and by keeping the lubricating oil in the recessed portions, a lower frictional property was obtained. Due to presence of the non-oxidized portion 6, conformability is considered to become favorable.

In comparative example 5, the overlay 22 is not present, and therefore, adhesion wear in which the base member 1 is worn while adhering to the counterpart member easily occurs. The adhesion wear causes large wear powders, and therefore, the wear amount is large. As the test time elapses, the slide receiving surface 7 of the base member 1 is oxidized and hardened, and the wear amount reduces. However, in comparative example 5, the wear amount directly after the test is large, and therefore, the wear amount is large as compared with examples 1 to 5.

Comparative examples 6 and 7 have the ratios of $H_1/H_2$ larger than comparative examples 1 to 5, and therefore, a larger amount of hydrogen is contained in the overlays thereof than those of examples 1 to 5. When the counter part members slide on the overlays of comparative examples 6 and 7, the overlays abrade earlier than those of examples 1 to 5 and the base members 1 are exposed. At this time, the solid lubricants are eliminated on the base members 1 of comparative examples 6 and 7 before suitable conformability occurs, and the exposed portions of the base members 1 may become hard due to frictional heat. When the counterpart member slides on the base member 1 which becomes hard without occurrence of suitable conformability, the base member 1 is violently word, and large wear powders is easily generated from the base member 1, as a result of which, comparative examples 6 and 7 have a large wear amount.

From comparison of examples 1 to 5 and comparative examples 3, 4 and 7, it is understood that if the film thickness of the overlay 22 is 2 μm or less, the wear amount can be reduced. It is considered that this is because the overlay 22 is difficult to remove. From the comparison of example 1 and comparative example 5, by having the overlay 22, the overlay 22 exhibits the effect of the solid lubricant. Especially when the overlay is 0.05 μm or more, the overlay 22 exhibits the effect of the solid lubricant.

The invention claimed is:

1. A slide member, comprising:
a base member, and
an overlay provided on a slide receiving surface of the base member,
wherein the slide member satisfies the following relational expression:

$$1 < H_1/H_2 \leq 5$$

where $H_1$ is an average hydrogen amount per unit quantity in the overlay, and $H_2$ is an average hydrogen amount per unit quantity in the base member.

2. A slide member, comprising:
a base member, and an overlay provided on a slide receiving surface of the base member,
wherein the overlay is formed by attaching a mixed solid lubricant to the slide receiving surface of the base member, the mixed solid lubricant being made by mixing at least two kinds of solid lubricants which are a large amount of hydrogen containing solid lubricant which contains a large amount of hydrogen and a small amount of hydrogen containing solid lubricant which contains a smaller amount of hydrogen than that of the large amount of hydrogen containing lubricant, and
wherein the slide member satisfies the following relational expression:

$$1 < H_1/H_2 \leq 5$$

where $H_1$ is an average hydrogen amount per unit quantity in the overlay, and $H_2$ is an average hydrogen amount per unit quantity in the base member.

3. A slide member, comprising:
a base member, and an overlay provided on a slide receiving surface of the base member,
wherein the overlay is formed by attaching a mixed solid lubricant to the slide receiving surface of the base member, the mixed solid lubricant being made by mixing at least two kinds of solid lubricants which are a large amount of hydrogen containing solid lubricant which contains a large amount of hydrogen and a small amount of hydrogen containing solid lubricant which contains a smaller amount of hydrogen than that of the large amount of hydrogen containing lubricant;
wherein a lubricant absence region, where the overlay is absent is present on the slide receiving surface of the base member after sliding;
and an oxidized portion where the base member is oxidized is formed toward the inside of the base member from the lubricant absence region.

4. The slide member according to claim 1,
wherein a lubricant absence region, where the overlay is absent, is present on the slide receiving surface of the base member after sliding; and
an oxidized portion where the base member is oxidized is formed toward the inside of the base member from the lubricant absence region.

5. The slide member according to claim 2,
wherein a lubricant absence region, where the overlay is absent, is present on the slide receiving surface of the base member after sliding; and
an oxidized portion where the base member is oxidized is formed toward the inside of the base member from the lubricant absence region.

6. The slide member according to claim 3, wherein the depth of the oxidized portion is 0.01 to 0.7 μm from the surface of the base member.

7. The slide member according to claim 4, wherein the depth of the oxidized portion is 0.01 to 0.7 μm from the surface of the base member.

8. The slide member according to claim 5, wherein the depth of the oxidized portion is 0.01 to 0.7 μm from the surface of the base member.

9. The slide member according to claim 1, wherein the thickness of the overlay is 2 μm or less.

10. The slide member according to claim 2, wherein the thickness of the overlay is 2 μm or less.

* * * * *